Feb. 25, 1969

E. H. LORENCE 3,429,393

DRIVE MECHANISM

Filed Dec. 8, 1966

Inventor
Ervin H. Lorence
By Andrus & Starke
Attorneys.

United States Patent Office 3,429,393
Patented Feb. 25, 1969

1

3,429,393
DRIVE MECHANISM
Ervin H. Lorence, Milwaukee, Wis., assignor to Lorence Manufacturing Corp., a corporation of Wisconsin
Filed Dec. 8, 1966, Ser. No. 600,117
U.S. Cl. 180—9.62                    7 Claims
Int. Cl. B62d 55/08; F16h 1/28

ABSTRACT OF THE DISCLOSURE

A drive mechanism particularly adapted for driving the endless treads of construction equipment. A hydraulic motor is carried by the tread frame and the drive shaft of the motor carries an eccentric journalled for rotation within the central opening in a floating gear unit. The gear unit is provided with an inner gear which meshes with a fixed gear ring connected to the tread frame and the inner gear has a lesser number of teeth than the fixed gear ring. The floating gear unit also includes an outer gear which meshes with the internal teeth of a second gear ring connected to the drive wheel for the endless tread. The second gear ring has a greater number of teeth than the mating outer gear and the difference in the number of teeth between the outer gear and the second gear ring is the same as the difference in the number of teeth between the inner gear and the fixed gear ring.

Figure 1:
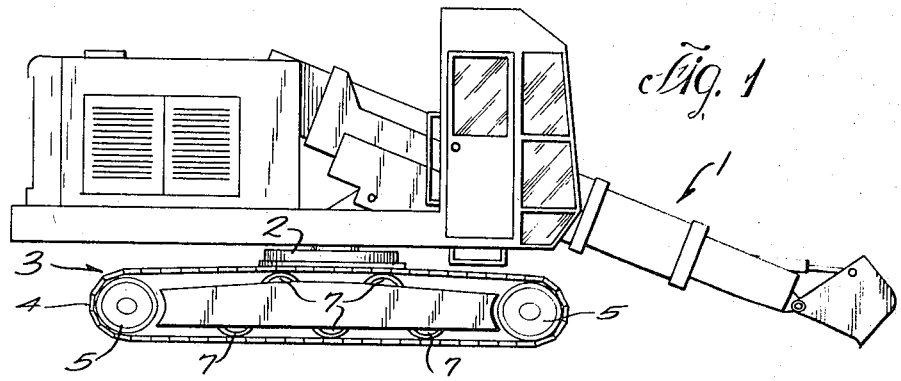

The inner and outer gears rotate together at the same speed and the outer gear ring, which is connected to the drive wheel for the tread, is moved by a wedging action in the opposite direction and at a slower rate of speed than the outer gear to provide a speed reduction.

---

This invention relates to a rotary drive mechanism and more particularly to a drive mechanism for the endless treads or crawlers used with construction equipment.

Heavy construction equipment, such as a backhoe, bulldozer or crane, is usually supported for movement on a pair of endless treads or crawlers with each tread being engaged with one or more drive wheels which serve to move the tread in an endless path and thereby move the unit over the ground. In the conventional unit the drive wheels are rotated by a mechanical gear box or gear train mechanism.

The present invention is directed to a hydraulic drive mechanism which is particularly adaptable to driving the endless treads of heavy construction equipment such as backhoes, cranes, bulldozers and the like. According to the invention, each endless tread is driven by one or more hydraulic drive wheel assemblies, with each drive wheel assembly being a self-contained unit mounted on the frame of the thread unit. More specifically, each drive wheel assembly includes a hydraulic motor and the drive shaft of the motor carries an eccentric which is journaled for rotation within a central opening in a floating ring. The peripheral surface of the floating ring is provided with an inner gear having a series of teeth which engage the internal teeth on a fixed gear ring and the teeth of the fixed gear ring are of identical size to the teeth in the inner gear, but the gear ring has a greater number of teeth than the gear so that the external diameter of the gear is substantially smaller than the internal diameter of the gear ring. As the eccentric is rotated, the gear is moved by a wedging action in the opposite direction and at a slower rate of speed than the eccentric to provide a speed reduction.

The floating ring also includes a larger outer gear which is connected integrally with the smaller inner gear and rotates with the smaller inner gear. The outer gear is also provided with a series of teeth identical in size to the teeth of the inner gear and which mesh with the in-

2 ternal teeth of a second gear ring which is connected to the drive wheel for the tread. The second gear ring has a greater number of teeth than the mating outer gear and the difference in the number of teeth between the outer gear and the second gear ring is the same as the difference in number of teeth between the inner gear and the fixed gear ring.

The inner gear and outer gear, which are both an integral part of the floating ring, rotate together at the same speed, and the outer gear ring, which is connected to the drive wheel, will be moved by a wedging action in the opposite direction and at a slower rate of speed than the outer gear to provide a second speed reduction and thereby drive the wheel at a substantially reduced rate of speed.

The drive mechanism of the invention provides a substantial speed reduction from the hydraulic motor to the drive wheel that carries the tread with a minimum number of parts. By decreasing the number of parts, the overall cost of the drive mechanism is reduced over conventional units.

As a further advantage, the drive mechanism is extremely compact and the motor and transmission are carried by the tread unit itself so that there is no transmission or gear train mounted in the frame.

Moreover, the engagement of the gears with the gear rings provides a positive lock against free drive wheel rotation and eliminates the necessity for a locking mechanism. The positive lock provided by the gears prevents the drive wheel from rotating by gravity if the bulldozer or backhoe is parked on a hill or slope. In most conventional drive mechanisms, a separate brake is required to prevent free rotation of the tread by gravity.

The drive mechanism of the invention is a packaged unit which can be readily installed without boring the frame to mount bearings or transmissions as required for the conventional drive mechanism. The drive mechanism is also highly versatile and drive wheels or sprockets of different sizes and shapes can be readily mounted on the unit to accommodate various types of treads.

A further advantage is that the drive mechanism is stronger than conventional units, and there is less danger of shearing of shafts and teeth. In the unit of the invention, a substantial number of teeth of each gear are in engagement with the teeth on the corresponding gear ring at any one time, thus providing a stronger unit which is not dependent on the individual strength of the gear teeth.

The weight of the machine is supported on a series of ball bearings rather than on wheel shafts as in the conventional unit, and as the ball bearing race has a substantial diameter, this enables the unit to be subjected to greater loads without the danger of shaft fracture.

Other objects and advantages will appear in the course of the following description.

The drawings illustrate the best mode presently contemplated of carrying out the invention.

Figure 3:
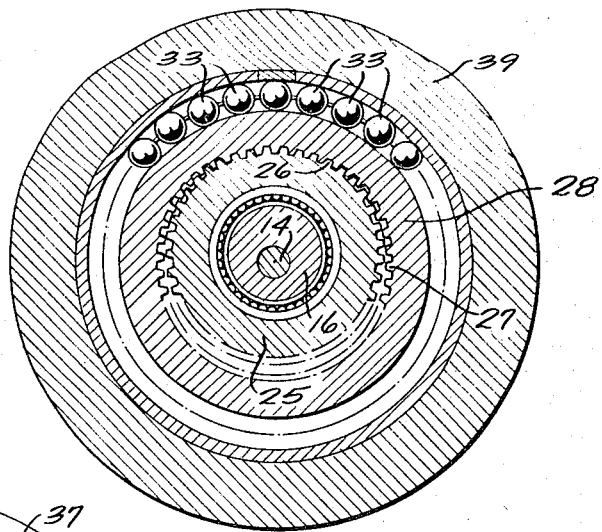
Figure 4:
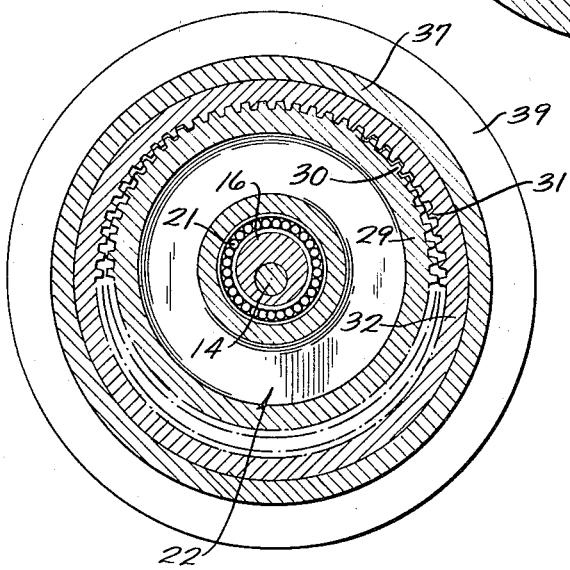
Figure 2:
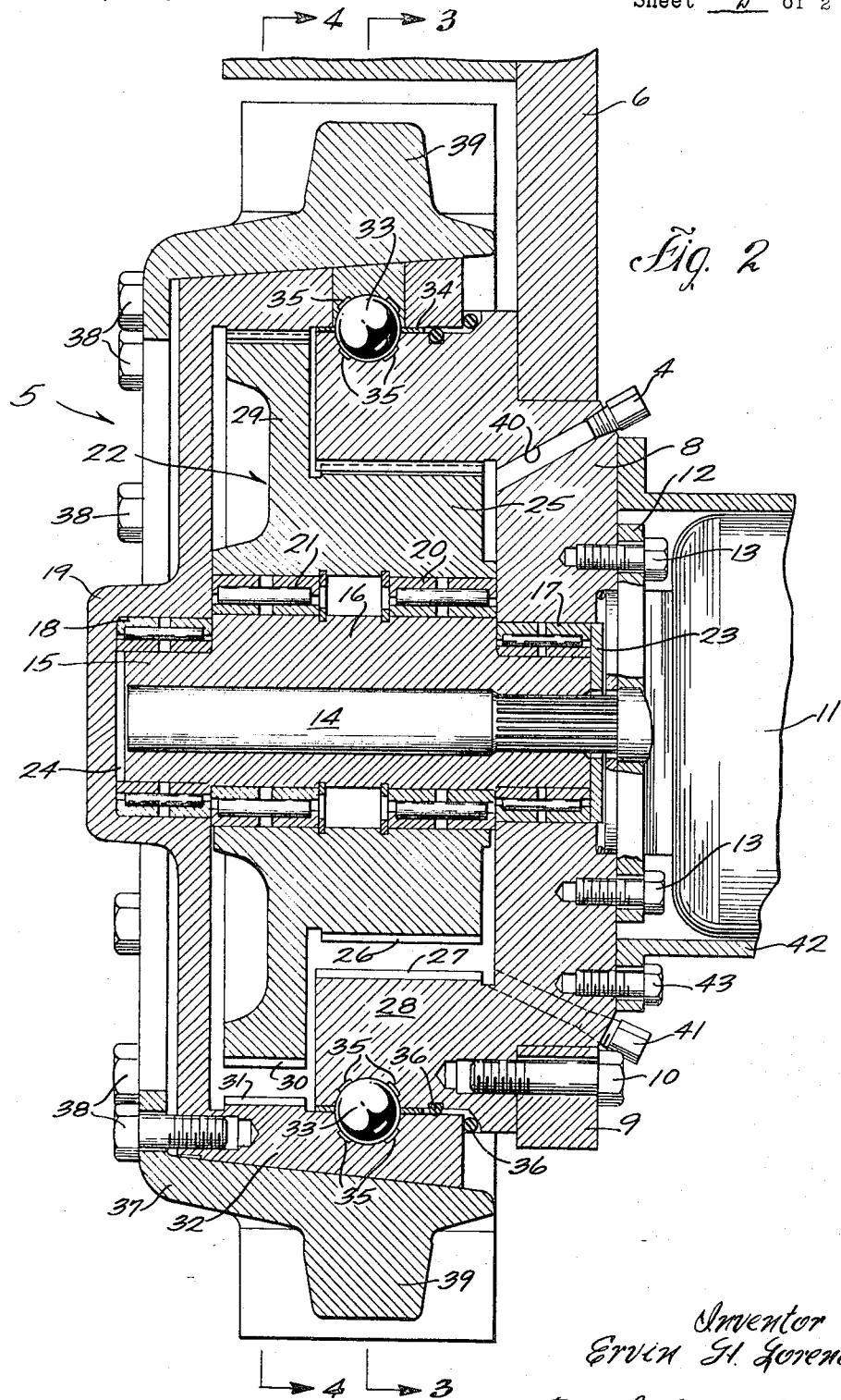

In the drawings:
FIG. 1 is a side elevation of a conventional backhoe employing the drive mechanism of the invention;
FIG. 2 is a vertical section showing the wheel drive mechanism of the invention;
FIG. 3 is a section taken along line 3—3 of FIG. 2; and
FIG. 4 is a section taken along line 4—4 of FIG. 2.

The drawings illustrate a conventional backhoe having a cab and engine unit 1 supported on a turntable 2 which is mounted for rotation on the tread unit 3. The tread unit 3 comprises a pair of endless treads 4 and each tread 4 is driven by a pair of drive wheel assemblies 5 which are mounted on the frame 6 of the tread unit. In addition, each endless tread 4 is supported at positions throughout its length by a series of idler wheels 7.

As shown in FIG. 2, the drive wheel assembly 5 includes an inner casting 8 which is secured to a support ring 9 of frame 6 by a series of bolts 10. A reversible hydraulic motor 11 is mounted directly on casting 8 through a base plate 12 which is secured by bolts 13 to the casting 8. Shaft 14 which is driven by motor 11 carries a sleeve 15 and the central portion of sleeve 15 defines an eccentric 16. The sleeve 15 is journaled for rotation by a pair of roller bearing assemblies 17 and 18 which journal the ends of the sleeve within an opening in the casting 8 and within a recess in outer casting 19, respectively. In addition to roller bearing assemblies 17 and 18, a pair of roller bearing assemblies 20 and 21 serve to journal the eccentric 16 in the central opening of a floating ring 22. In addition to the roller bearing assemblies, a thrust bearing 23 is positioned between the inner end of the sleeve 15 and the motor base plate 12 and a second thrust bearing 24 is disposed between the outer end of the sleeve 15 and the inner surface of the outer casting 19.

The floating ring 22 is formed with an inner gear 25 having a series of teeth 26 which engage the teeth 27 of a fixed gear ring 28 which is formed integrally with the base casting 8. As the eccentric 16 rotates, the gear 25 is moved by the eccentric at a reduced speed and in the opposite direction of rotation of the eccentric by a wedging type of action.

While the shape of the teeth 26 and 27 is not critical teeth 26 and 27 are of identical shape and size. The ring 28 has a greater number of teeth than the gear 25 and generally there will be from 2 to 4 more teeth 27 than teeth 26. This results in the external diameter of the gear 25 being substantially smaller than the internal diameter of the gear ring 28. Due to the difference in the number of teeth, only about 10 or 12 teeth of the gear 25 will be in engagement with the teeth 27 at any time during rotation of the gear 25.

The floating ring 22 is also provided with a second outer gear 29 having a series of teeth 30 which mesh with the teeth 31 of a gear ring 32 which is an integral part of the outer casting 19. The teeth 30 and 31 are identical in size and shape to each other and are also identical in size and shape to the teeth 26 and 27. There are a lesser number of teeth 30 than teeth 31, and the difference between the number of teeth is the same as the difference in the number of teeth between the teeth 26 and 27. For example, if there are 85 teeth 31 and 82 teeth 30, a difference of three, there can be 40 teeth 27 and 37 teeth 26, also a difference of three.

As the outer gear 29 is formed integrally with the inner gear 25, the gear 29 will rotate with the gear 25 and the gear ring 32 will slip or move by a wedging action in the opposite direction to provide a second speed reduction.

The casting 19 is journaled for rotation around the casting 8 by a series of ball bearings 33, which rotate within races formed in the respective castings. The bearings 33 are located within separate openings in annular retaining strip 34 which is disposed between the castings 8 and 19. As the ball bearings are subjected to a considerable load, portions of the casting 19 and the casting 8 are recessed or relieved as indicated by 35 to reduce the area of contact between the ball bearings 33 and the cooperating races of the members 8 and 19. As shown in FIG. 2, the reliefs 35 are located at 45° with respect to the vertical and horizontal, and this location of the reliefs 35 serves to prevent undue frictional contact between the bearings and the cooperating surfaces and yet enables the bearings to transmit the load.

O-ring seals 36 are located in the joint between the castings 8 and 19 to seal the space therebetween.

A drive wheel or sprocket 37 is connected to the outer casting 19 by a series of bolts 38 and the wheel 37 and the outer casting have cooperating inclined surfaces which provide a tight wedging engagement between the members. The drive wheels 37 are conventional in structure and include a series of drive pins 39 which are adapted to engage grooves in the endless treads 4. The shape and structure of wheels, drive pins and treads can vary, depending on the particular requirements and the type of construction equipment involved.

The interior chamber defined by the base casting 8 and the outer casting 19 is adapted to contain oil or other lubricating medium, which serves not only to lubricate the bearings, but also to lubricate the meshing teeth of the gears. To introduce and withdraw oil from the interior, a pair of oil passages 40 are formed in the base casting 8 and the passages are normally enclosed by plugs 41.

To protect the motor 11 a shield or housing 42 is positioned around the motor and the flange of the housing 42 is connected to the base casting 8 by a series of bolts 43.

The eccentric 16 is freely journaled within the central opening of the floating ring 22 and as the eccentric is rotated by the motor 11 the ring 22 is moved at a reduced speed and in the opposite direction of rotation of the eccentric 16 by a wedging type of action. For example, if the gear 25 contains 37 teeth 26 while the gear ring 28 contains 40 teeth, a difference of 3, the gear 25 will move through an arc equal to the length of 3 teeth during each revolution of the eccentric 16. Thus a speed reduction is provided between the input shaft and the gear 25 and the gear will only move through an arc equal in length to the difference in the number of teeth between the gear 25 and the gear ring 28 during each revolution of the eccentric 16.

As the gear 25 is fixed to the gear 29, the gear 29 will move through the same angular displacement as the gear 25. However, as the teeth 30 on the gear 29 are the same size as the teeth 26 on gear 25, the angular displacement does not equal the arc inscribed by the 3 teeth on gear 29. Thus as the gear 29 moves with the gear 25, the ring 32 and attached outer casting 19 will slip or move by a wedging action in the opposite direction. Thus the ring 32 and casting 19 will move in the opposite direction a distance sufficient to enable the teeth 30 on gear 29 to maintain engagement with the teeth 31 of ring 32 and this results in the ring 32 moving in the opposite direction and at a slower speed than the gear to provide a second speed reduction.

The drive mechanism of the invention provides a substantial speed reduction with a minimum number of parts. By decreasing the number of parts involved in the transmission, the overall cost of the drive mechanism is reduced over conventional units.

The entire drive mechanism, which includes the motor and transmission, is carried by the tread unit so that there is no gear train or transmission mounted on the frame of the machine, nor is it necessary to provide any bearings or journaling members in the frame for shafts which carry transmission elements as in the conventional unit.

The engagement of the gears with the gear rings provides a positive lock against free drive wheel rotation and eliminates the necessity for a separate locking or brake mechanism. As a further advantage, the drive mechanism is stronger than conventional units in that a substantial number of teeth of each gear are in engagement with the teeth on the corresponding gear ring in any one time, thus providing a unit which is not dependent on the individual strength of the gear teeth.

The weight of the backhoe or other construction equipment is supported on the series of ball bearings 33 rather than on the wheel shafts as in a conventional unit. As the ball bearing race has a substantial diameter, this enables the unit to be subjected to greater loads without the danger of shaft fracture.

Various modes of carrying out the invention are contemplated as being within the scope of the following claims particularly pointed out and distinctly claiming the subject matter which is regarded as the invention.

I claim:

1. A drive mechanism, comprising an endless element, a frame to support the endless element in endless movement, a prime mover carried by the frame and having a drive shaft, eccentric means operably connected to the drive shaft, an annular member having a central opening to rotatably receive the eccentric means, a first gear associated with the annular member and having a first series of teeth, a fixed first gear ring connected to the frame and having a series of internal teeth disposed in engagement with the teeth on the first gear, said first gear ring having a greater number of teeth than said first gear, a second gear associated with the annular member, said second gear having a second series of teeth, a rotatable second gear ring having a series of internal teeth engaged with the teeth of said second gear, said second gear ring having a greater number of teeth than said second gear and the difference in teeth between the first gear and the first gear ring being the same as the difference in number of teeth between the second gear and the second gear ring, and connecting means disposed radially outward of said second gear ring and operably connecting said second gear ring to said endless element for transmitting rotation of said second gear ring to said element and thereby drive said element in said endless path.

2. The drive mechanism of claim 1, in which said connecting means comprises a drive member disposed concentrically of the axis of said drive shaft and having connecting elements operably connected to said endless element.

3. The mechanism of claim 1, in which the prime mover is a hydraulic motor and the drive shaft extends generally horizontal.

4. The mechanism of claim 1, in which the second gear ring is journaled for rotation on the outer surface of the first fixed gear ring.

5. The mechanism of claim 1, in which said first gear has a substantially smaller diameter than said second gear.

6. The mechanism of claim 4, in which a series of ball bearings disposed in a substantially vertical plane act to journal the second gear ring on the outer surface of the first gear ring, and said connecting means comprises a drive member disposed concentrically of the axis of said drive shaft and having connecting elements operably connected to said endless element, said connecting elements being disposed substantially in said vertical plane.

7. A drive mechanism for driving the endless tread of a vehicle, comprising an endless element, a frame to support the endless element in endless movement in a vertical plane, a motor carried by the frame and having a generally horizontal drive shaft, eccentric means operably connected to the drive shaft, an annular member having a central opening to rotatably receive the eccentric means, a first gear associated with the annular member and having a first series of teeth, a fixed first gear ring connected to the frame and disposed radially outward of said shaft and having a series of internal teeth disposed in engagement with the teeth on the first gear, said first gear ring having a greater number of teeth than said first gear, a second gear associated with the annular member, said second gear having a second series of teeth, a rotatable second gear ring having a series of internal teeth engaged with the teeth of said second gear, said second gear ring having a greater number of teeth than said second gear and the difference in teeth between the first gear and the first gear ring being the same as the difference in number of teeth between the second gear and the second gear ring, journalling means disposed in said vertical plane for journalling said second gear ring for rotation about the axis of said shaft, and a drive member disposed radially outward of said second gear ring and integrally connecting said second gear ring to said endless element for transmitting rotation of said second gear ring to said element and thereby drive said element in said endless path.

References Cited

UNITED STATES PATENTS

| | | | |
|---|---|---|---|
| 606,158 | 6/1898 | Belanger | 74—805 |
| 1,320,460 | 11/1919 | Ellett | 74—805 |
| 2,076,239 | 4/1937 | Lemmon | 308—190 |
| 2,667,089 | 1/1954 | Gregory | 74—804 X |
| 2,765,669 | 10/1956 | Tangen | 308—190 X |
| 2,771,958 | 11/1956 | Ball | 180—6.48 |
| 2,906,356 | 9/1959 | Richard | 180—6.48 |
| 2,990,726 | 7/1961 | McDonald | 74—805 X |
| 3,255,840 | 6/1966 | Tangen | 74—805 |

ARTHUR T. McKEON, *Primary Examiner.*

U.S. Cl. X.R.

74—805